United States Patent
Balasaygun et al.

(10) Patent No.: US 11,637,929 B2
(45) Date of Patent: Apr. 25, 2023

(54) EFFICIENT MEDIA ESTABLISHMENT FOR WEBRTC CALL CENTER AGENTS

(71) Applicant: Avaya Management L.P., Durham, NC (US)

(72) Inventors: Mehmet Balasaygun, Freehold, NJ (US); Manish Chatterjee, Pune (IN); Stephen Whynot, Allen, TX (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/110,102

(22) Filed: Dec. 2, 2020

(65) Prior Publication Data
US 2022/0174152 A1 Jun. 2, 2022

(51) Int. Cl.
*H04M 3/51* (2006.01)
*H04L 65/65* (2022.01)
*H04L 65/1069* (2022.01)

(52) U.S. Cl.
CPC ...... *H04M 3/5191* (2013.01); *H04L 65/1069* (2013.01); *H04L 65/65* (2022.05)

(58) Field of Classification Search
USPC .................................................. 379/265.09
See application file for complete search history.

(56) References Cited

U.S. PATENT DOCUMENTS

| | | | | |
|---|---|---|---|---|
| 6,563,814 B2* | 5/2003 | Rowan | .................... | H04Q 3/62 370/352 |
| 7,539,127 B1* | 5/2009 | Shaffer | ................... | H04L 67/14 370/216 |
| 7,787,611 B1* | 8/2010 | Kotelly | ................. | H04M 7/123 379/265.11 |
| 8,634,543 B2 | 1/2014 | Flockhart et al. | | |
| 2010/0172488 A1* | 7/2010 | Segall | ................. | H04M 3/5183 379/266.07 |
| 2010/0235218 A1 | 9/2010 | Erhart et al. | | |
| 2010/0296417 A1 | 11/2010 | Steiner | | |
| 2011/0125793 A1 | 5/2011 | Erhart et al. | | |
| 2011/0125826 A1 | 5/2011 | Erhart et al. | | |
| 2014/0270119 A1* | 9/2014 | Bischoff | ............. | H04M 3/5183 379/265.09 |
| 2015/0036690 A1* | 2/2015 | Pastro | ................. | H04L 65/1023 370/401 |
| 2019/0356701 A1* | 11/2019 | Prabhu | ................ | H04L 65/4061 |

* cited by examiner

*Primary Examiner* — Amal S Zenati
(74) *Attorney, Agent, or Firm* — Sheridan Ross P.C.

(57) ABSTRACT

Connecting agent to customers is the cornerstone of contact center operations. When a customer is connected to an agent for real-time communications (e.g., voice), they can be particular sensitive to any delay, such as the delay to establish a media channel between the agent's endpoint and the customer's device. By establishing a media channel between the agent's device and a server having initially received the communication, the communication may be attached to the existing media channel without requiring the time and resources otherwise necessary to establish the media channel. Additionally, if a problem or failure occurs, a server utilized for the connection may seek to establish the media channel with a second network, such as a telephone network, or a second agent endpoint or endpoint component.

20 Claims, 8 Drawing Sheets

EFFICIENT MEDIA ESTABLISHMENT FOR WEBRTC CALL CENTER AGENTS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for connecting nodes on a network and particularly to reducing setup time for real-time communications between connected nodes.

BACKGROUND

In prior art contact center solution, where the agents may work remotely using devices that are WebRTC media enabled, there is a need for the media establishment to be done quickly so that neither the agent nor the customer experiences media setup delays after the call establishment. This is often achieved in a H.323 protocol-based contact centers such as Avaya Contact Center Elite, where the agents were always media connected to Avaya Aura Communication Manager (CM).

SUMMARY

While the solutions of the prior art may reduce audio setup delays, it does not efficiently reduce the media flow to/from an agent's endpoint while an agent was in-between calls. In addition, the prior art solutions create a significant traffic load on VPN gateways, which are required to carry media in remote worker scenarios. In order to avoid the above limitations in a modern IP media technology environment, that makes use of web real-time communications (WebRTC) media protocols, a different solution is needed to support good quality, low latency setup media streams.

In one embodiment, WebRTC agents are always connected on the media path to a media server and, as a result, improvements in the user experience from incoming call may be realized, such as by reducing setup time required to establish a communication channel for media between the customer and the agent.

In certain contact center solutions, when voice and video (i.e., real-time media) agents are in service, incoming calls to their agent communication device, which may be identified by an extension number and can be auto-answered by the system, and the end-to-end media path is automatically set up. Such a solution is compatible with H.323 endpoints or other endpoints where incoming calls are presented to an in-service agent over a pre-established call session and media channel. An incoming call over the pre-established media channel is indicated to the agent, such as by playing a short tone (e.g., "zip tone") to the agent.

In a contact center solution, where WebRTC media endpoints are used as agent clients, establishment of the WebRTC media channel(s) requires media capabilities, such as Session Description Protocol (SDP) exchange, followed by Interactive Connectivity Establishment (ICE) negotiation to establish connectivity, and the ICE negotiation, despite the deployment of the optimization technologies such as trickle ICE—where all ICE pathways are not determined in their entirety before beginning to exchange media—but there may still be a noticeable or even unacceptable amount of time before the agent and customer are connected on the media channel. Such delays degrade the customer's and the agent's experience. This issue may become more prevalent in remote worker scenarios where the agents may be connected to the contact center solution remotely via firewall(s) with varying set of policies. Remote workers' endpoints may provide call signaling and media services to a "cloud" deployment or in an "enterprise deployment" either in a private cloud and/or to on-premises equipment.

To address shortcomings of the prior art and to advance the state of the art, embodiments disclosed herein are generally directed to reducing the end-to-end media setup time and provide an improved user experience during an incoming call and to provide network resiliency for agents' media connection with the contact center.

In one embodiment, when an agent logs in to the contact center system, the endpoint provides a signal indicating a desire to negotiate and establish media connectivity before being placed into service by the system. The system may allow or reject this request, such as based on a policy rule and/or the current state (e.g., load) on the media sub-system. Assuming the system allows this request for media establishment, the system returns a response to the client asking the client to initiate media negotiation with the system. Additionally or alternatively, the initial login request from the agent's client could have included the SDP offer of the agent's client, therefore avoiding the extra signaling needed for the initial SDP offer to be presented to the system. The system sends back an SDP answer to the agent's client, and both the system's media server and the agent's client start ICE negotiation. Assuming the ICE negotiation successfully completes, the media between the agent's client and the system's media server is established. At this point, the agent's login is successful.

In another embodiment, and as an alternative to terminating media natively on the agent's client and in order to support media termination at a separate device, during the login process, the agent application can provide the address of a secondary media device that the system can query to negotiate and set up the agent's media session with the separate device. Alternatively, the secondary media device may be instructed by the agent's client application to initiate a request towards the system to set up the media session. In another embodiment, the media channel between the agent's client and the system is kept up, and is reused for all incoming and/or outgoing calls while the agent is logged in.

In another embodiment, such as to preserve bandwidth to/from media servers, the agent's client and the media server may choose to stop exchanging real time media packets while the agent is not handling calls in between consecutive calls (e.g., while in "aux" mode for CC Elite users). Instead, they exchange periodic Session Traversal Utilities for Network Address Translation (NAT) or "STUN" packets and/or RTCP packets (assuming real-time transport protocol (RTP) and RTP control protocol (RTCP) were negotiated to be multiplexed over a single media stream) to keep the open ports (i.e., pinholes) open at the firewall(s) between the client and the media server.

Generally, an incoming call to a contact center environment first goes through a contact center's agent selection process and, once an agent is selected, the customer's media is joined to the agent's media resource on the media server. For calls that are not based on WebRTC media (e.g., Public Switched Telephone Network (PSTN) or cellular calls), there is only a minimal media set up delay between the customer and the agent.

In another embodiment, finding an alternate media path is disclosed, such as when the primary WebRTC media path fails or when there is a degradation of the media quality of the current call. More specifically, if the periodic exchange of STUN or RTCP packets fails for a configured number of attempts in a configured amount of time, there is RTP/RTCP level information indicating degradation of media and the agent's client may try to reach out to the system by establishing a call over PSTN or mobile phone network and disabling the WebRTC media session with the system. Additionally or alternatively, the system, upon detection of the failure on the WebRTC media channel, may try to reach out to the agent's alternate address (e.g., PSTN or mobile number) for the secondary device, and bring the agent into service when the media path to the agent can be established via the alternate address. If the media experience is not improved, the system may choose to keep the agent at a lower level of traffic than usual, while trying to restore the primary (WebRTC based) media channel.

In another embodiment, after the alternate path through PSTN or mobile number is established, the WebRTC media session restoration is automatically attempted by the client or the system, in order to bring the agent back into service. If the agent's primary media channel can be re-established, the alternate media path is ended and the call resumes on the primary (WebRTC) media channel.

In one embodiment, a system is disclosed, comprising: a server comprising a network interface to a first network; wherein the server receives a media request, via the first network, from an agent endpoint to establish media connectivity over a media channel; wherein the server, in response to the media request, signals the agent endpoint to initiate media connectivity negotiations; wherein the server, in response to the agent endpoint initiating media connectivity negotiations, performs media connectivity negotiations with the agent endpoint; wherein the server, in response to the agent endpoint successfully negotiating media connectivity, establishes a media channel with the agent endpoint; and wherein the server, after establishing the media channel and upon subsequently receiving a first communication from a first customer communication device, connects the agent endpoint to the customer communication device utilizing the media channel.

In another embodiment, a method is disclosed, comprising: receiving a media request, via a first network, from an agent endpoint to establish media connectivity over a media channel; in response to the media request, signaling the agent endpoint to initiate media connectivity negotiations; in response to the agent endpoint initiating media connectivity negotiations, performing media connectivity negotiations with the agent endpoint; in response to the agent endpoint successfully negotiating media connectivity, establishing a media channel with the agent endpoint; and after establishing the media channel and upon subsequently receiving a first communication from a first customer communication device, connecting the agent endpoint to the customer communication device utilizing the media channel.

In another embodiment, a communication device is disclosed, comprising: a processor having a non-transitory memory comprising machine-readable instructions for execution by the processor; a network interface to a network; wherein the processor: sends, via the network, a media request for media connectivity with a server; receives, in response to the media request, a signal to initiate media connectivity negotiations; negotiates, in response to the signal, performs media connectivity negotiations with the server and, as a result, establishes a media channel with the server via the network; and serially receiving, conducting, and terminating a plurality of communications with a corresponding plurality of customer communication devices, wherein each of the plurality of communications is conducted utilizing the media channel as established.

Other embodiments contemplated including any of the above comprising a system on a chip (SoC); one or more means for performing any one or more of the above aspects; and any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
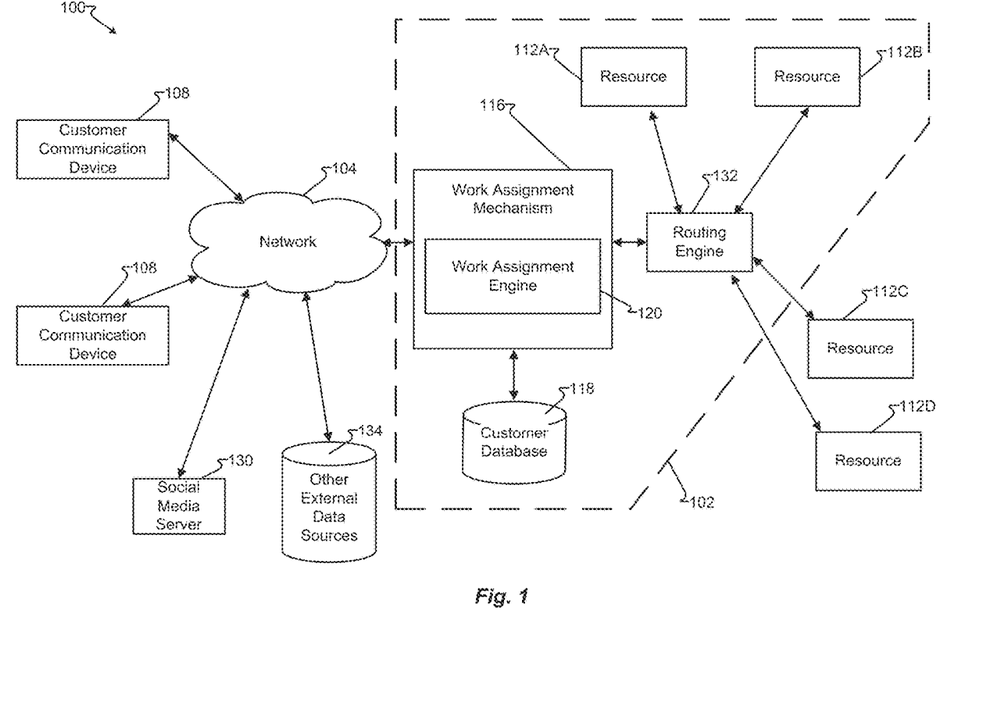
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108. In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. Resources 112A-112B may be within the trusted network portion of contact center 102 and optionally be physically on-site as contact center 102. In another embodiment, resources, such as resources 112C-112D may be external to the trusted portion of the network of contact center 102. Although not illustrated to avoid unnecessarily complicating the figure, resources 112C and 112D may utilize network 104 and/or other network(s).

The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

Figure 2:
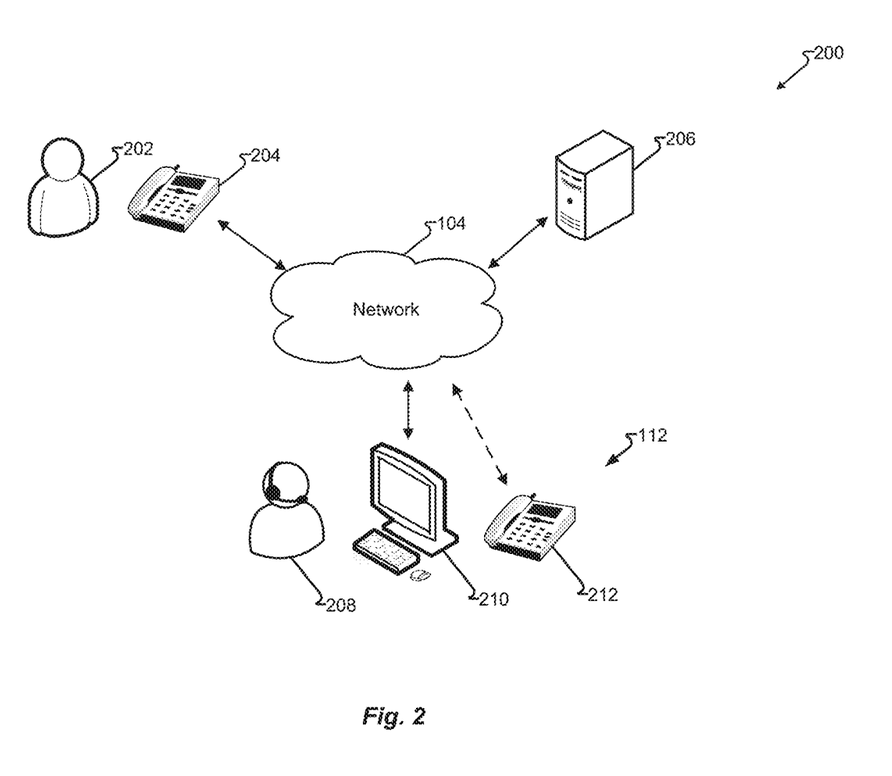
FIG. 2 depicts a second system in accordance with embodiments of the present disclosure.

FIG. 2 depicts system 200 in accordance with embodiments of the present disclosure. In one embodiment, resources 112 is configured for real-time communications (e.g., voice, video) wherein latency, including latency setting up the media channel is to be avoided. Customer communication device 204 comprises customer communication device 108 configured for real-time communication.

In one embodiment, resource 112, such as agent 208 utilizing agent endpoint 210 first need to logon to media server 206 and/or other server such as a server running work assignment mechanism 116, work assignment engine 120, and/or routing engine 132. The logon process provides, among other things, notification that agent 208, via agent endpoint 210, is available to receive communications. As a portion of the logon process, or at some point after logon, agent endpoint 210 may request the establishment of a media connection with media server 206. If media server 206 is able, media server 206 signals agent endpoint 210 to begin negotiations to establish a media connection and, if successful, a media channel is created between media server 206 and agent endpoint 210 and the media connection established. The media channel may be distinct from the signaling channel utilized to negotiate the connection.

Subsequently, customer 202 wishes to engage in a communication with one of the resources 112. The communication may be a real-time communication. In other embodiments, non-real-time communication (e.g., data file exchange, text, etc.) are also contemplated herein. Utilizing customer communication device 204, customer 202 initially connects with contact center 102, The call may be initially screened, such as with one of the resources 112 being an automated resources, such as an interactive voice response system. If connection with a live agent is determined to be necessary, a particular resource 112 or grouping of resources 112 is performed and the call is enqueued for the next available resource 112 or optionally, enqueued for a specific resource 112. Here, the selected or designated resource 112 is agent 208 utilizing agent endpoint 210. A media channel is established between customer communication device 204 and media server 206, such as a PSTN or cellular telephone call. Media server 206 then joins the call to the existing media channel established with agent endpoint 210 and customer 202 and agent 208 are then connected and may speak and/or see each other (such as when customer communication device 204 and agent endpoint 210 are configured for video input and output). In one embodiment, the media channel comprises a WebRTC channel between agent endpoint 210 (and optionally secondary agent endpoint 212) and media server 206, but not a client-to-client WebRTC connection between customer communication device 204 and agent endpoint 210 (or secondary agent endpoint 212), except when comprising media server 206. Additionally or alternatively, the media channel may be a Session Initiation Protocol (SIP) media stream separate from the signaling stream.

In another embodiment, the call has concluded and customer communication device 204 is disconnected from media server 206. However, agent endpoint 210 and media server 206 remain connected via the previously established media channel. In other words, after the call with customer communication device 204 has terminated, the media channel previously established between agent endpoint 210 and media server 206 is maintained. Accordingly, the same media channel is available for use with subsequent calls and not taken down and re-established.

Should the communication channel fail, entire or partially (e.g., insufficient quality), media server 206 may seek to establish a media channel connection with secondary agent endpoint 212. Secondary agent endpoint 212 may be embodied as a PSTN or cellular telephone. This second media channel connection may utilize network 104 or a different network (e.g., telephony, cellular, etc.).

Figure 3:
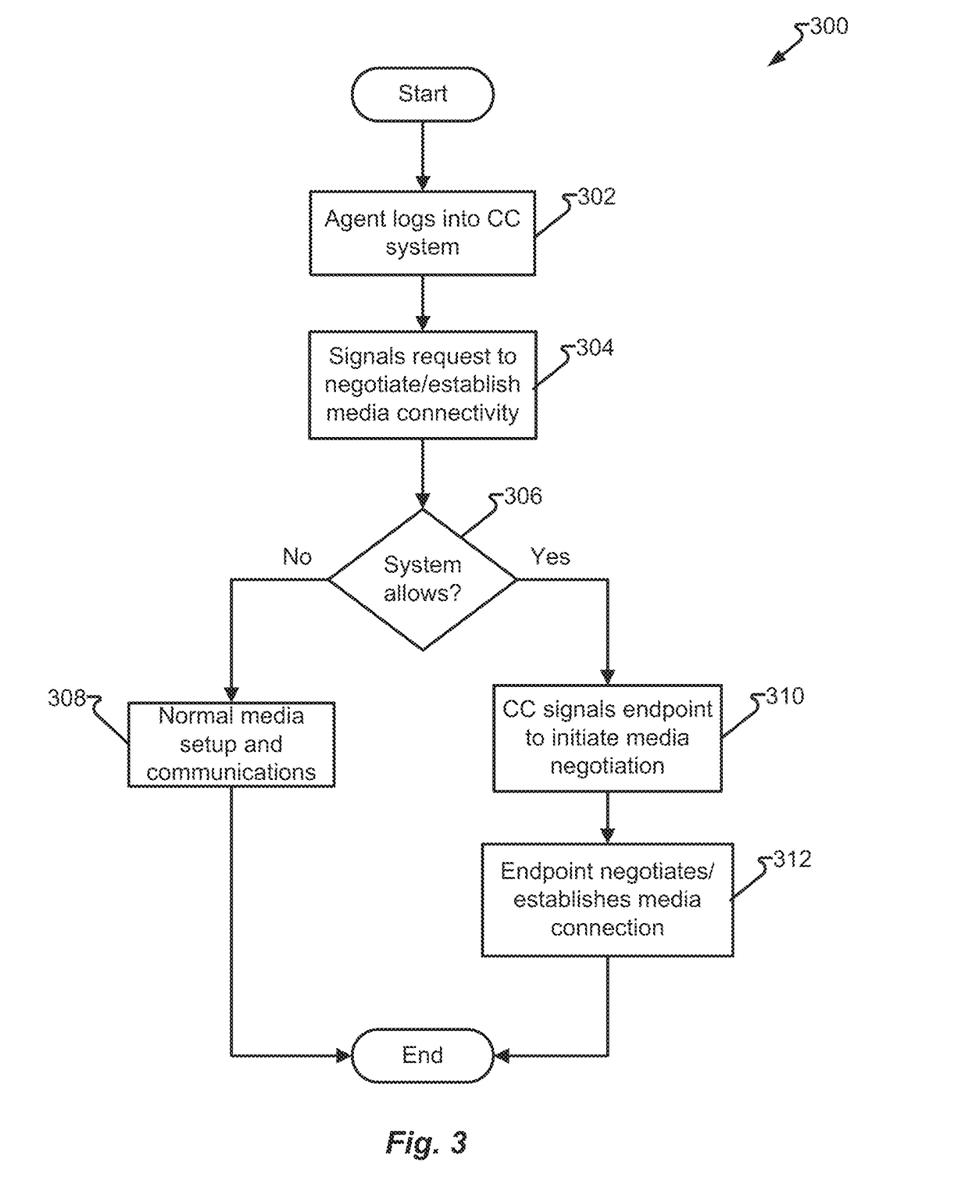
FIG. 3 depicts a first process in accordance with embodiments of the present disclosure.

FIG. 3 depicts process 300 in accordance with embodiments of the present disclosure. In one embodiment, process 300 is embodied as machine-readable instructions to cause one or more processors to perform the steps of process 300. In one embodiment, process 300 begins and, in step 302, an agent logs into a contact center (CC) system utilizing agent endpoint 210, the CC then makes services, such those provided by media server 206 available to agent 208 via agent endpoint 210. In other embodiments, logging-in may be into a component in communication with customer communication device 204, such as a network server of contact center 102, wherein the other component, at least in part, processes the login an enables communication from agent endpoint 210 and customer communication device 204.

Next, in step 304, agent endpoint 210 signals an intent to negotiate, in order to establish, a media connection, such as media channel, with media server 206, such as by sending an SDP offer. Test 306 determines if the system allows the media connectivity. For example, media server 206 and/or other component may be configured to accept or deny some or all request, such as due to the current load on media server 206 and/or other component or policy. If test 306 is determined in the negative, processing continues to step 308, such to utilize a normal setup a communication. For example, for each call a WebRTC client-to-client connection is established and taken down between customer communication device 204 and agent endpoint 210. If test 306 is determined in the affirmative, processing continues to step 310.

In step 310, a component of the contact center signals the endpoint to initiate media negotiations. Step 310 may be an SDP answer. In response, in step 312, the end point initiates the media negotiations and, if successful, the media channel connection is formed. Step 312 may be an ICE or trickle ICE negotiation. For example, agent endpoint 210 negotiates and establishes a median channel connection with media server 206.

Figure 4:
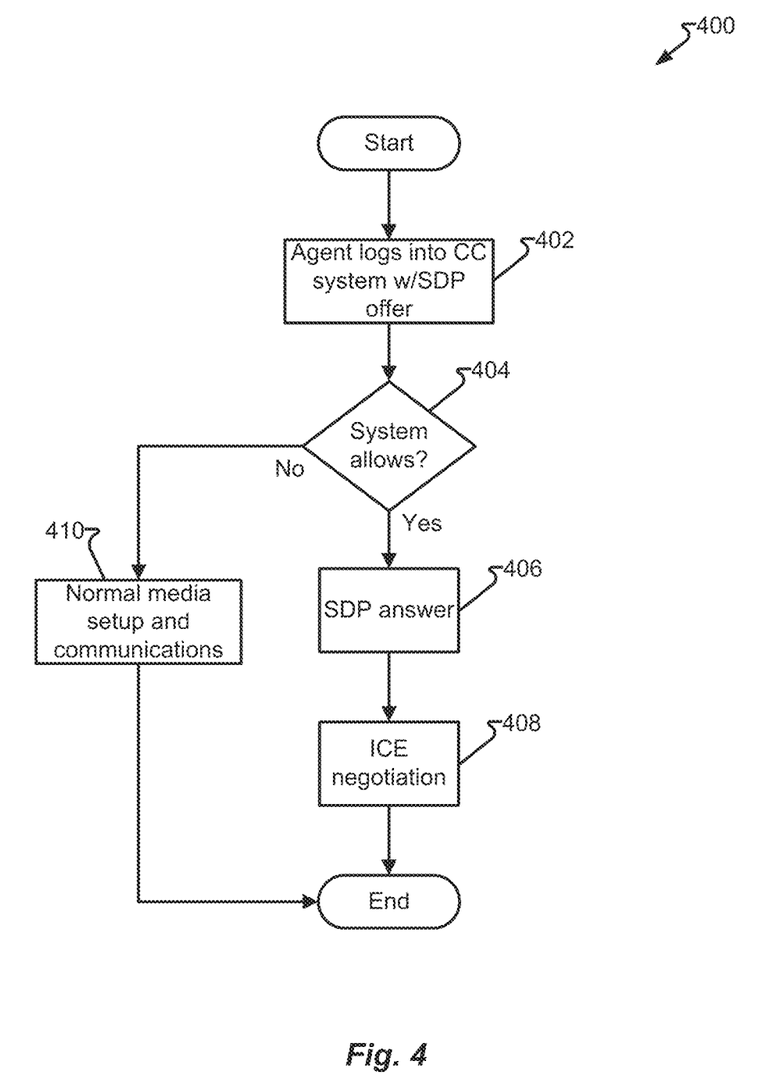
FIG. 4 depicts a second process in accordance with embodiments of the present disclosure.

FIG. 4 depicts process 400 in accordance with embodiments of the present disclosure. In one embodiment, process 400 is embodied as machine-readable instructions to cause one or more processors to perform the steps of process 400. In one embodiment, process 400 generally resembles process 300 with at least the exception that the requires for establishing the media channel is concurrent with logging in. Accordingly, process 400 begins and, at step 402, the agent logs into the contact center system with request to establish a media channel. For example, agent endpoint 210 logs in to a component of contact center 102, such as media server 206, with an SDP offer. Step 402 may be a single step process, for example, agent endpoint 210 may login and, based on a configuration file accessible to media server 206, it is known that agent endpoint 210 requests a media channel each time a login operation is performed. Alternatively, step 402 may be a two-step process wherein an initial login, such as a network login or login to media server 206, must be successfully completed and, in response, agent endpoint 210 automatically requests establishment of a media channel.

Next, test 404 is performed, such as by media server 206 and/or other component of contact center 102 to determine if the request for the media channel can be honored. If test 404 is determined in the negative, processing continues to step 410 wherein a prior-art type connection may be made, such as a new WebRTC connection for each communication with each customer communication device 204. If test 404 is determined in the affirmative, processing continues to step 406.

Step 406 answers the request, such as with an SDP answer and causes agent endpoint 210 to initiate media negotiates and, unless unsuccessful, ICE/trickle ICE negotiations in step 408 to establish the media channel.

Figure 5:
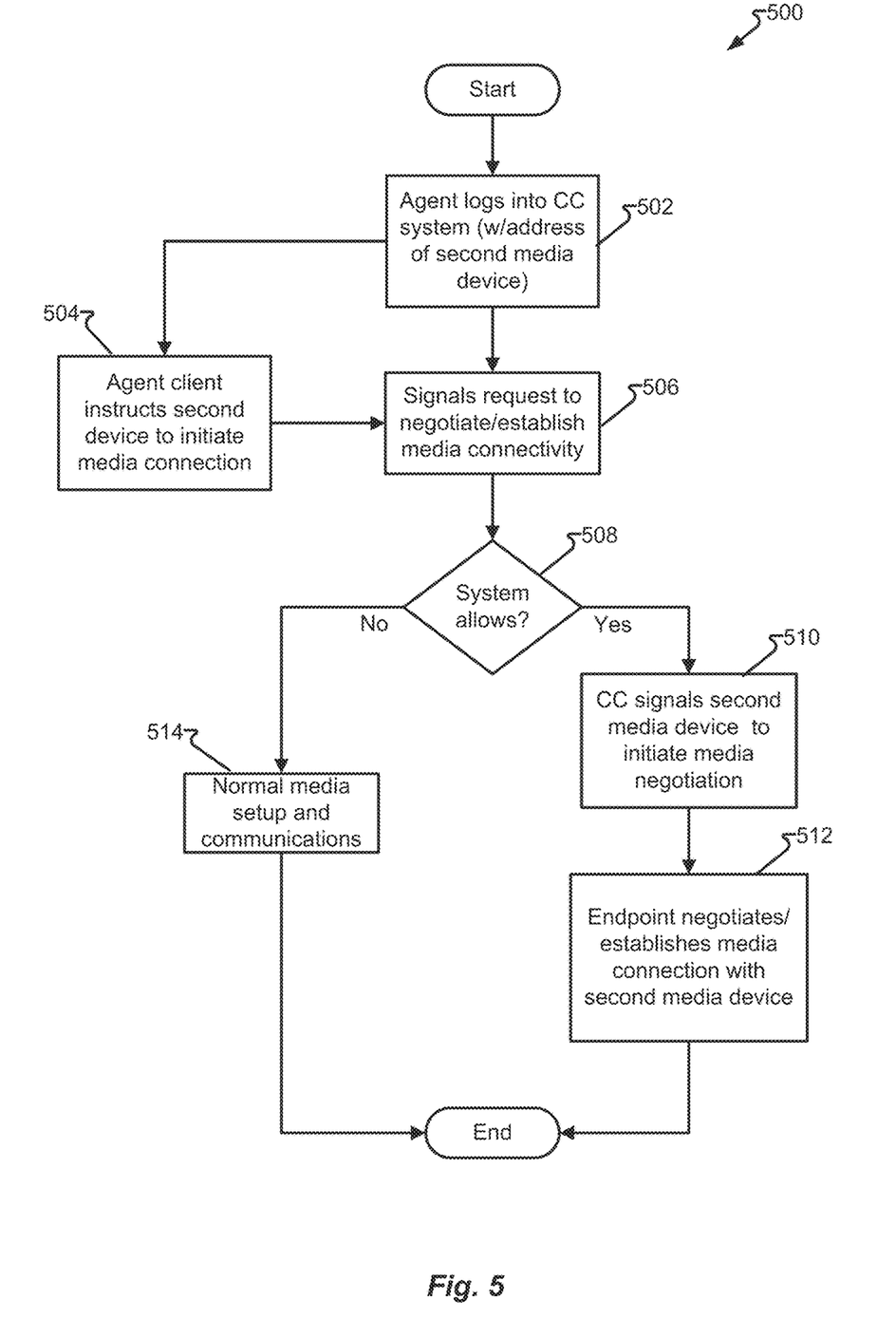
FIG. 5 depicts a third process in accordance with embodiments of the present disclosure.

FIG. 5 depicts process 500 in accordance with embodiments of the present disclosure. In one embodiment, process 500 is embodied as machine-readable instructions to cause one or more processors to perform the steps of process 500. In one embodiment, an agent logs into a contact center system and provides a second address in step 502. For example, agent endpoint 210 logs into media server 206 and/or other component of contact center 102 and provides the address of secondary agent endpoint 212. In one embodiment, processing continues to step 504 wherein the agent client instructions the second device to initiate the media conference. In step 506, the agent's endpoint, such as agent endpoint 210 or, upon execution of step 504, secondary agent endpoint 212 signals media server 206 with a request to initiate and establish a media channel connection.

Test 508 determines if the system allows the media connectivity. For example, media server 206 and/or other component may be configured to accept or deny some or all request, such as due to the current load on media server 206 and/or other component or policy. If test 508 is determined in the negative, processing continues to step 514, such to utilize a normal setup a communication. For example, for each call a WebRTC client-to-client connection is established and taken down between customer communication device 204 and agent endpoint 210. If test 508 is determined in the affirmative, processing continues to step 510.

In step 510, a component of the contact center signals a second device, such as secondary agent endpoint 212, to initiate media negotiations. Step 510 may be an SDP answer. In response, in step 512, the secondary device initiates the media negotiations and, if successful, the media channel connection is formed comprising the second device (e.g., secondary agent endpoint 212). Step 512 may be an ICE or trickle ICE negotiation.

Figure 6:
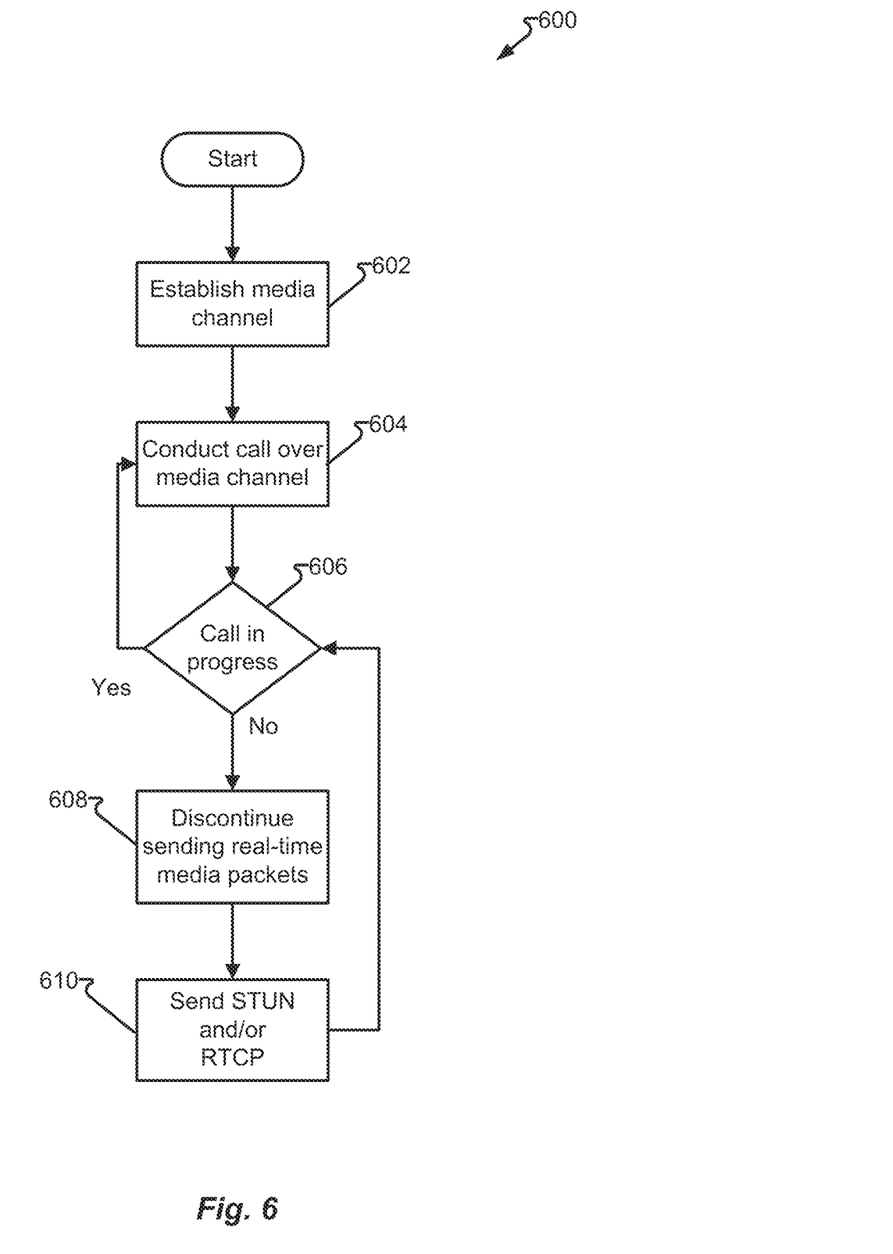
FIG. 6 depicts a fourth process in accordance with embodiments of the present disclosure.

FIG. 6 depicts process 600 in accordance with embodiments of the present disclosure. In one embodiment, process 600 is embodied as machine-readable instructions to cause one or more processors to perform the steps of process 600. In one embodiment, process 600 illustrates step 602 as the establishment of a media channel between an agent endpoint, such as agent endpoint 210 (or optionally a secondary device, such as secondary agent endpoint 212) and media server 206, as described elsewhere here. Next, step 604 conducts a media session, such as a voice or video call, via the media session.

With the media channel established a call may, or may not be currently in progress, as determined by test 606. If test, 606 is determined in the affirmative, processing continues back to step 604. When test 606 is determined in the negative, processing continues to step 608, and real-time media packets sent by the agent endpoint and/or the media server are discontinued. Next, one or both of the agent endpoint or the media server sends a STUN and/or RTCP packet, which may be repeated periodically, such as to preserve the bandwidth allocated for the media channel. Processing may continue back to test 606 and, if a new call is received, test 606 will be determined in the affirmative, otherwise step 608 maintains the discontinuation of real-time media packets and step 610 sends periodic STUN and/or RTCP packets.

Figure 7:
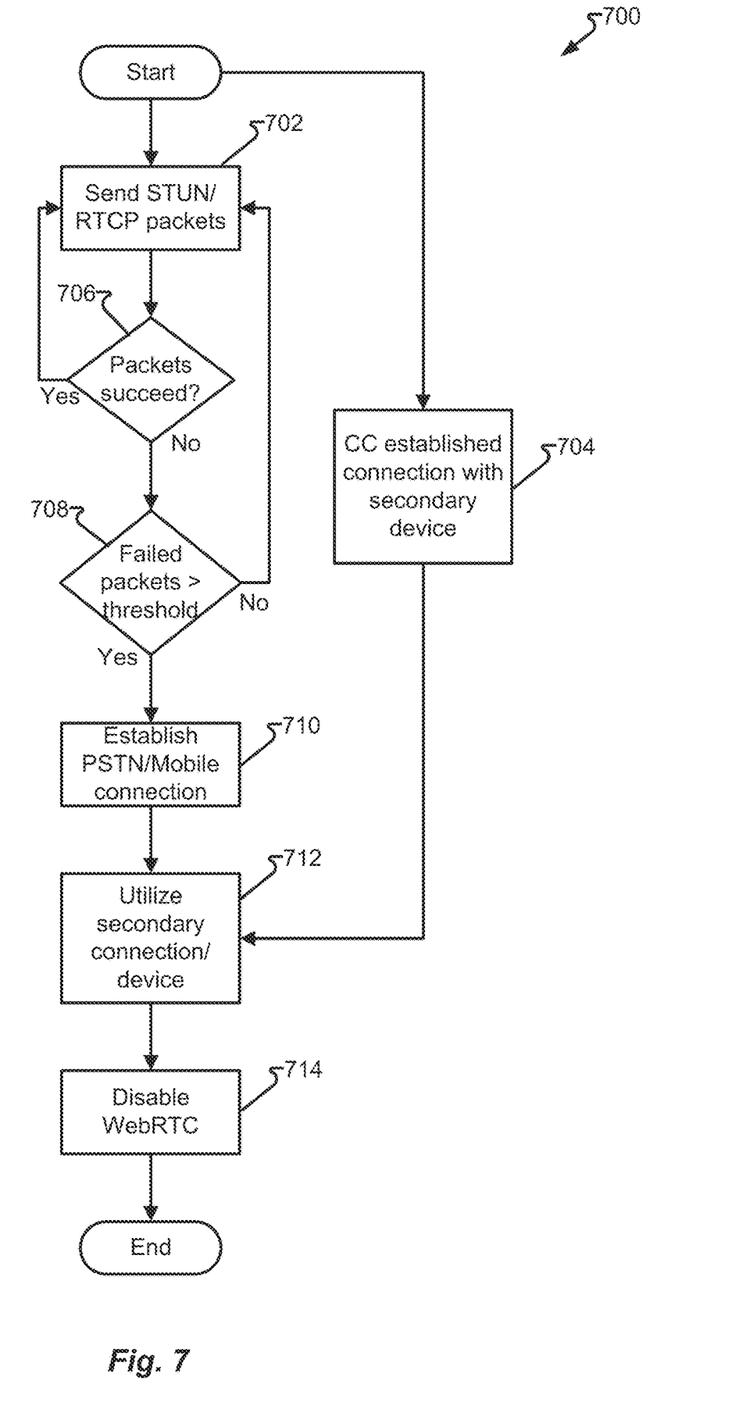
FIG. 7 depicts a fifth process in accordance with embodiments of the present disclosure.

FIG. 7 depicts process 700 in accordance with embodiments of the present disclosure. In one embodiment, process 700 is embodied as machine-readable instructions to cause one or more processors to perform the steps of process 700. Process 700 illustrates steps that occur after a media channel has been established between an agent's endpoint and a media server, such as agent endpoint 210 and media server 206, respectively. Periodically, in step 702, the agent's endpoint and/or the media server send a STUN and/or RTCP packet. Test 706 determines if the packets where successfully received and, if so, as determined by test 706, processing continues back to step 702. However, if test 706 is determines the packets have not succeeded, then processing continues to test 708 to evaluate whether the failure of the packet sent in step 702, in combination with a number of prior packets sent in prior executions of step 702, are above a previously determined threshold within a previously determined period of time. The specific values of the threshold number and/or time period is a matter of design choice and may be selected to reflect the historic or current state of a network and/or outages. For example, for a highly reliable network, such network 104, a small number of failed packets in a short period of time may indicate a serious problem. In contrast, and in another example, a network known to have connectivity and/or quality issues or periods of known outages may have a higher threshold for failed packets and/or a longer period of time for which failed packets are considered. If test 708 is determined in the negative, processing may loop back to step 702, such as to reattempt to send the STUN/RTCP packet. If test 708 is determined in the affirmative, processing continues to step 710.

Step 710 seeks to establish a secondary connection, such as a connection that comprises, a different network in whole or in part. For example, network 104 may be a public packet-based network (e.g., Internet) and the secondary connection utilizes a PSTN and/or cellular network in whole or in part. Step 710 may be initiated by the agent endpoint and/or contact center, such as a media server. Once connected, step 712 utilizes the secondary connection for the media channel. Furthermore, a connection between a primary device (e.g., agent endpoint 210) and a media server (e.g., media server 206), such as a WebRTC connection, is disabled.

In another embodiment process 700 may be performed, at least in part by a contact center component initiating the media channel with the secondary device in step 704, such as when media server 206 determines the primary device, or connection to the primary device, has failed or has insufficient quality. Accordingly, step 712 and step 714, if enabled, are executed as described above.

Figure 8:
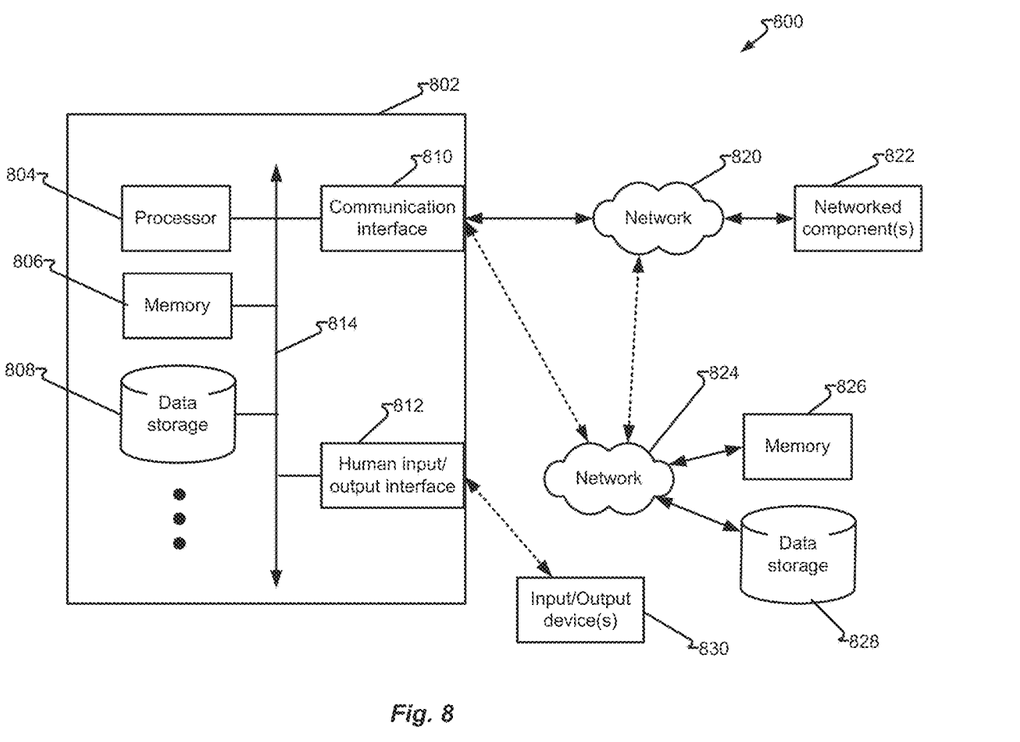
FIG. 8 depicts a third system in accordance with embodiments of the present disclosure.

FIG. 8 depicts system 800 in accordance with embodiments of the present disclosure.

In one embodiment, agent endpoint 210, media server 206, and/or secondary agent endpoint 212 may be embodied, in whole or in part, as device 802 comprising various components and connections to other components and/or systems. The components are variously embodied and may comprise processor 804. Processor 804 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 814, executes instructions, and outputs data, again such as via bus 814. In other embodiments, processor 804 may comprise a shared processing device that may be utilized by other processes and/or process owners, such as in a processing array or distributed processing system (e.g., "cloud", farm, etc.). It should be appreciated that processor 804 is a non-transitory computing device (e.g., electronic machine comprising circuitry and connections to communicate with other components and devices). Processor 804 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 804) and the hardware and other circuitry thereof.

In addition to the components of processor 804, device 802 may utilize memory 806 and/or data storage 808 for the storage of accessible data, such as instructions, values, etc. Communication interface 810 facilitates communication with components, such as processor 804 via bus 814 with components not accessible via bus 814. Communication interface 810 may be embodied as a network port, card, cable, or other configured hardware device. Additionally or alternatively, human input/output interface 812 connects to one or more interface components to receive and/or present information (e.g., instructions, data, values, etc.) to and/or from a human and/or electronic device. Examples of input/output devices 830 that may be connected to input/output interface include, but are not limited to, keyboard, mouse, trackball, printers, displays, sensor, switch, relay, etc. In another embodiment, communication interface 810 may comprise, or be comprised by, human input/output interface 812. Communication interface 810 may be configured to communicate directly with a networked component or utilize one or more networks, such as network 820 and/or network 824.

Network 104 may be embodied, in whole or in part, as network 820. Network 820 may be a wired network (e.g., Ethernet), wireless (e.g., WiFi, Bluetooth, cellular, etc.) network, or combination thereof and enable device 802 to communicate with networked component(s) 822. In other embodiments, network 820 may be embodied, in whole or in part, as a telephony network (e.g., public switched telephone network (PSTN), private branch exchange (PBX), cellular telephony network, etc.)

Additionally or alternatively, one or more other networks may be utilized. For example, network 824 may represent a second network, which may facilitate communication with components utilized by device 802. For example, network 824 may be an internal network to a business entity or other organization, such as contact center 102, whereby components are trusted (or at least more so) that networked components 822, which may be connected to network 820 comprising a public network (e.g., Internet) that may not be as trusted.

Components attached to network 824 may include memory 826, data storage 828, input/output device(s) 830, and/or other components that may be accessible to processor 804. For example, memory 826 and/or data storage 828 may supplement or supplant memory 806 and/or data storage 808 entirely or for a particular task or purpose. For example, memory 826 and/or data storage 828 may be an external data repository (e.g., server farm, array, "cloud," etc.) and allow device 802, and/or other devices, to access data thereon. Similarly, input/output device(s) 830 may be accessed by processor 804 via human input/output interface 812 and/or via communication interface 810 either directly, via network 824, via network 820 alone (not shown), or via networks 824 and 820. Each of memory 806, data storage 808, memory 826, data storage 828 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 830 may be a router, switch, port, or other communication component such that a particular output of processor 804 enables (or disables) input/output device 830, which may be associated with network 820 and/or network 824, to allow (or disallow) communications between two or more nodes on network 820 and/or network 824. For example, a connection between one particular customer, using a particular customer communication device 108, may be enabled (or disabled) with a particular networked component 822 and/or particular resource 112. Similarly, one particular networked component 822 and/or resource 112 may be enabled (or disabled) from communicating with a particular other networked component 822 and/or resource 112, including, in certain embodiments, device 802 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor(s)). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system.

For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a server comprising a network interface to a first network;
wherein the server receives a media request, via the first network, from an agent endpoint to establish media connectivity over a media channel;
wherein the server, in response to receiving the media request, signals the agent endpoint to initiate media connectivity negotiations;
wherein the server, in response to the agent endpoint initiating media connectivity negotiations, performs media connectivity negotiations with the agent endpoint via a signaling channel;
wherein the server, in response to the agent endpoint successfully negotiating media connectivity, establishes a media channel with the agent endpoint, wherein the media channel is distinct from the signaling channel;
wherein the server, after establishing the media channel and upon subsequently receiving a first communication from a first customer communication device, connects the agent endpoint to the first customer communication device utilizing the media channel; and
after the first communication has terminated, a second customer communication from a second customer communication device is connected to the agent endpoint utilizing the media channel previously established.

2. The system of claim 1, wherein the server receives a login request from the agent endpoint, the login request comprising the media request.

3. The system of claim 1, wherein the server signals the agent endpoint to initiate media connectivity negotiations comprising a Session Description Protocol (SDP) answer.

4. The system of claim 1, wherein the media connectivity negotiations comprise Interactive Connectivity Establishment (ICE) negotiations.

5. The system of claim 1, wherein the media connectivity negotiations comprise trickle Interactive Connectivity Establishment (ICE) negotiations.

6. The system of claim 1, wherein the server establishes the media channel with the agent endpoint comprising a second network different from the first network.

7. The system of claim 6, wherein the second network comprises at least one of a public switched telephone network (PSTN) or a cellular telephony network.

8. The system of claim 6, wherein the server the server establishes the media channel with the agent endpoint comprising the second network, upon the media channel failing with the first network.

9. The system of claim 8, wherein the media channel failing with the first network is determined by a failure to successfully exchange a previously determined number of message packets with the agent endpoint over a previously determined period of time and wherein message packets exchanged with the agent endpoint comprise at least one of Session Traversal Utilities for Network Address Translation (STUN) or real-time transport protocol control protocol (RTCP).

10. A method, comprising:
receiving a media request, via a first network, from an agent endpoint to establish media connectivity over a media channel;
in response to receiving the media request, signaling the agent endpoint to initiate media connectivity negotiations;
in response to the agent endpoint initiating media connectivity negotiations, performing media connectivity negotiations with the agent endpoint via a signaling channel;
in response to the agent endpoint successfully performing media connectivity negotiations, establishing a media channel with the agent endpoint, wherein the media channel is distinct from the signaling channel;
after establishing the media channel and upon subsequently receiving a first communication from a first customer communication device, connecting the agent endpoint to the first customer communication device utilizing the media channel;
terminating the first communication; and
connecting a second customer communication, from a second customer communication device, to the agent endpoint utilizing the media channel previously established.

11. The method of claim 10, further comprising receiving a login request from the agent endpoint, wherein the login request comprising the media request.

12. The method of claim 10, wherein the media channel comprises a server between the agent endpoint and each of the first customer communication device and the second customer communication device and wherein the server signals the agent endpoint to initiate media connectivity negotiations comprising a Session Description Protocol (SDP) answer.

13. The method of claim 10, wherein the media connectivity negotiations comprise Interactive Connectivity Establishment (ICE) negotiations.

14. The method of claim 10, wherein the media connectivity negotiations comprise trickle Interactive Connectivity Establishment (ICE) negotiations.

15. The method of claim 10, wherein a server establishes the media channel with the agent endpoint comprising a second network different from the first network.

16. The method of claim 15, wherein the second network comprises at least one of a public switched telephone network (PSTN) or a cellular telephony network.

17. The method of claim 15, further comprising:
establishing the media channel with the agent endpoint comprising the second network, upon the media channel failing with the first network; and
wherein the media channel failing with the network is determined by a failure to successfully exchange a previously determined number of message packets with the agent endpoint over a previously determined period of time and wherein message packets exchanged with the agent endpoint comprise at least one of Session Traversal Utilities for Network Address Translation (STUN) or real-time transport protocol control protocol (RTCP).

18. A communication device, comprising:
a processor;
a network interface to a network; and
a computer-readable medium coupled to the processor, the computer-readable medium comprising one or more computer readable instructions, the processor executing the one or more computer readable instructions to:
send, via the network, a media request for media connectivity with a server;
receive, in response to the media request, a signal to initiate media connectivity negotiations via a signaling channel;
negotiate, in response to the signal, media connectivity negotiations with the server and, as a result, establish a media channel with the server via the network, wherein the media channel is distinct from the signaling channel; and
serially receive, conduct, and terminate each, of a plurality of communications with a corresponding plurality of customer communication devices, wherein each of the plurality of communications is conducted utilizing the established media channel.

19. The communication device of claim 18, wherein the processor executes instructions to provide a login request to the server, wherein the login request comprises the media request.

20. The communication device of claim 18, wherein the processor executes instructions to, upon receipt of a signal from the server, initiate media connectivity negotiations comprising a Session Description Protocol (SDP) answer.

* * * * *

UNITED STATES PATENT AND TRADEMARK OFFICE
CERTIFICATE OF CORRECTION

PATENT NO. : 11,637,929 B2
APPLICATION NO. : 17/110102
DATED : April 25, 2023
INVENTOR(S) : Mehmet Balasaygun, Manish Chatterjee and Stephen Whynot It is certified that error appears in the above-identified patent and that said Letters Patent is hereby corrected as shown below:

In the Claims

Column 22, Line 11, Claim 17 after "failing with the" please insert --first-- therein.

Signed and Sealed this
Twelfth Day of September, 2023

Katherine Kelly Vidal
*Director of the United States Patent and Trademark Office*